(12) United States Patent
Retersdorf (10) Patent No.: US 11,913,377 B2
(45) Date of Patent: Feb. 27, 2024

(54) ENVIRONMENTAL CONTROL SYSTEMS

(71) Applicant: Raytheon Technologies Corporation, Farmington, CT (US)

(72) Inventor: Alan F. Retersdorf, Avon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/675,191

(22) Filed: Feb. 18, 2022

(65) Prior Publication Data

US 2023/0265793 A1 Aug. 24, 2023

(51) Int. Cl.
*F02C 6/08* (2006.01)
*F02C 9/18* (2006.01)
*B64D 13/06* (2006.01)

(52) U.S. Cl.
CPC ............... *F02C 6/08* (2013.01); *F02C 9/18* (2013.01); *B64D 2013/0648* (2013.01); *F05D 2260/213* (2013.01)

(58) Field of Classification Search
CPC ........................................................ F02C 6/08
See application file for complete search history.

(56) References Cited

U.S. PATENT DOCUMENTS

| | | |
|---|---|---|
| 3,339,349 A | 9/1967 | Farnum |
| 4,681,610 A | 7/1987 | Warner |
| 4,963,174 A | 10/1990 | Payne |
| 4,966,005 A | 10/1990 | Cowell et al. |
| 5,125,597 A * | 6/1992 | Coffinberry ............... F02C 7/32 454/71 |
| 5,918,472 A | 7/1999 | Jonqueres |
| 6,615,606 B2 | 9/2003 | Zywiak |
| 6,971,241 B2 | 12/2005 | Critchley et al. |
| 8,789,376 B2 | 7/2014 | Coffinberry |
| 8,932,021 B2 | 1/2015 | Colson et al. |
| 10,059,457 B2 | 8/2018 | Klimpel et al. |
| 10,207,809 B2 | 2/2019 | Koerner et al. |
| 10,501,191 B1 | 12/2019 | Dooley et al. |
| 10,611,487 B2 | 4/2020 | Behrens et al. |
| 10,934,007 B2 | 3/2021 | Ho et al. |
| 11,077,949 B2 | 8/2021 | Behrens et al. |
| 2009/0113896 A1 | 5/2009 | Fukuda |
| 2010/0314877 A1 | 12/2010 | Finney |
| 2015/0307196 A1 * | 10/2015 | Bruno ......................... F02C 6/08 62/61 |
| 2015/0314877 A1 * | 11/2015 | McAuliffe ............. B64D 13/06 62/61 |

(Continued)

FOREIGN PATENT DOCUMENTS

GB 2450306 A * 12/2008 ................ F02C 3/10
JP 2008-94189 A 4/2008

OTHER PUBLICATIONS

European Search Report dated Jun. 30, 2023 for European Patent Application No. 23157612.5.

*Primary Examiner* — Gerald L Sung
*Assistant Examiner* — Alyson Joan Harrington
(74) *Attorney, Agent, or Firm* — Bachman & LaPointe, P.C.

(57) ABSTRACT

An aircraft propulsion system includes a gas turbine engine; an environmental control system (ECS); and a bleed flowpath from the gas turbine engine through the ECS. A turbine is along the bleed flowpath and a propulsion fan is mechanically coupled to the turbine to be driven by the turbine.

20 Claims, 5 Drawing Sheets

(56) References Cited

U.S. PATENT DOCUMENTS

| | | | |
|---|---|---|---|
| 2016/0347456 A1* | 12/2016 | Bruno | F02C 6/08 |
| 2016/0355270 A1 | 12/2016 | Bruno et al. | |
| 2017/0305558 A1 | 10/2017 | Bruno | |
| 2018/0148179 A1 | 5/2018 | Bruno | |
| 2019/0135441 A1 | 5/2019 | Bruno et al. | |
| 2019/0284965 A1 | 9/2019 | Retersdorf et al. | |
| 2020/0002007 A1 | 1/2020 | Retersdorf et al. | |
| 2020/0025207 A1* | 1/2020 | Mackin | B64D 13/06 |
| 2020/0277079 A1 | 9/2020 | Retersdorf et al. | |
| 2020/0340403 A1 | 10/2020 | Bartosz et al. | |
| 2021/0171204 A1 | 6/2021 | Retersdorf | |
| 2021/0188448 A1 | 6/2021 | Retersdorf | |
| 2021/0188449 A1 | 6/2021 | Retersdorf | |
| 2021/0348564 A1 | 11/2021 | Mackin et al. | |

\* cited by examiner

ENVIRONMENTAL CONTROL SYSTEMS

BACKGROUND

The disclosure relates to aircraft. More particularly, the disclosure relates to environmental control systems (ECS) in aircraft powered by gas turbine engines.

Gas turbine engines (used in propulsion and power applications and broadly inclusive of turbojets, turboprops, turbofans, and the like) power ECS in aircraft. One category of ECS are known as air cycle systems (ACS), sometimes identified by its air cycle machine (ACM) subsystem. Another group of ECS are known as vapor cycle systems (VCS).

In an example ACS, compressor bleed air is bled from an engine at an intermediate stage of compression. The compression has raised the temperature. Thus an example bleed is at a temperature of about 300° C. and a pressure of about 520 kPa. This may be distinguished from an in-flight external environmental condition of a temperature of about −15° C. and a pressure of about 60 kPa.

The bleed flowpath first passes through a primary heat exchanger (an air-to-air heat exchanger where the bleed flow is cooled by an environmental air flow such as a ram air flow). The bleed air exits the primary heat exchanger at a temperature of about 150° C.

Downstream of the primary heat exchanger, the bleed air is compressed by the centrifugal compressor of the ACM. The compression raises both temperature and pressure of the bleed flow. Bleed air exits the compressor at a temperature of about 280° C. and a pressure of about 830 kPa.

Downstream of the compressor, the bleed flowpath passes through a secondary heat exchanger (an air-to-air heat exchanger where the bleed flow is cooled by an environmental air flow such as a ram air flow—optionally the same air flow cooling the primary heat exchanger). The bleed air exits the secondary heat exchanger at a temperature of about 120° C.

Downstream of the secondary heat exchanger, the bleed air is expanded by the turbine of the ACM to mechanically drive the compressor. The expansion in the turbine lowers both temperature and pressure of the bleed flow. Bleed air exits the turbine at a temperature of about 40° C. and a pressure of about 410 kPa.

Downstream of the turbine, the bleed flowpath passes through a water collector (e.g., a can-type collector where swirl vanes centrifuge water from the airflow and the centrifuged water is drained). An example can-type water collector is shown in U.S. Pat. No. 4,681,610, (the '410 patent) of Warner, entitled "High performance water collector", and issued Jul. 21, 1987, the disclosure of which is incorporated by reference in its entirety herein as if set forth at length. A mesh or screen upstream of the collector helps coalesce the water droplets. An example of such a coalescing collector is shown in U.S. Pat. No. 3,339,349 (the '349 patent), of Farnum, entitled "Coalescer", and issued Sep. 5, 1967, the disclosure of which is incorporated by reference in its entirety herein as if set forth at length.

The bleed air exits the water collector at a temperature of about 40° C. Collected water may be dumped overboard directly or injected into the ram-air flow to enhance cooling in the primary and secondary heat exchangers. In other systems, the water collector is upstream of the turbine (e.g., immediately downstream of the secondary heat exchanger).

The cooled air may directly be used to cool a load such as avionics or may be blended with additional warmer air (e.g., an additional bleed or a bypass portion of the bleed) to provide cabin air services (e.g. pressurizing the cabin and providing heating or cooling).

In a condensing/reheat system variation on the particular example ACS of a water collector upstream of the turbine: 1) a reheat heat exchanger (reheater) heat rejecting/donor leg followed by a condenser heat rejecting/donor leg are added between the secondary heat exchanger and the water collector; 2) the reheater heat recipient/receiving leg is added downstream of the water collector; and 3) the turbine is moved to between the reheater heat recipient/receiving leg and the condenser heat recipient/receiving leg.

For example, U.S. Pat. No. 6,615,606, of Zywiak, entitled "Dual turbine bootstrap cycle environmental control system", and issued Sep. 9, 2003, discloses a particular condensing/reheat ACS. Heat receiving legs of a reheater and a condenser intervene between the secondary heat exchanger and the water collector upstream of a first turbine stage. Heat rejecting/donor legs of the condenser and reheater intervene between the first turbine stage and a second turbine stage.

Depending upon the nature of the aircraft, many of several cooling loads may predominate. These include passenger cabin climate control and avionics cooling. In passenger aircraft, the former predominate. In military aircraft, the latter predominate.

Cooling capacity, especially for ACS, generally comes at the expense of engine bleed air, and thus either specific fuel consumption (SFC) or thrust.

SUMMARY

One aspect of the disclosure involves an aircraft propulsion system comprising: a gas turbine engine; an environmental control system (ECS); and a bleed flowpath from the gas turbine engine through the ECS. A turbine is along the bleed flowpath and a propulsion fan is mechanically coupled to the turbine to be driven by the turbine.

In a further embodiment of any of the foregoing embodiments, additionally and/or alternatively, the turbine drives only the propulsion fan.

In a further embodiment of any of the foregoing embodiments, additionally and/or alternatively, the ECS has, sequentially along the bleed flowpath: a primary heat exchanger; a first leg of a reheater heat exchanger; a first leg of a condenser heat exchanger; a water collector; a second leg of the reheater heat exchanger in heat exchange relation with the first leg of the reheater heat exchanger; the turbine; a second leg of the condenser heat exchanger in heat exchange relation with the first leg of the condenser heat exchanger; and a load.

In a further embodiment of any of the foregoing embodiments, additionally and/or alternatively, a valve-controlled bypass flowpath bypasses the turbine from downstream of the reheater heat exchanger second leg to upstream of the condenser heat exchanger second leg.

In a further embodiment of any of the foregoing embodiments, additionally and/or alternatively, the primary heat exchanger provides heat exchange between the bleed flowpath and a ram air flowpath.

In a further embodiment of any of the foregoing embodiments, additionally and/or alternatively, the load is a passenger cabin air source.

In a further embodiment of any of the foregoing embodiments, additionally and/or alternatively: the reheater heat exchanger is a plate-fin heat exchanger; the condenser heat exchanger is a plate-fin heat exchanger; and the water collector is a can-type collector.

In a further embodiment of any of the foregoing embodiments, additionally and/or alternatively, the ECS does not have a compressor along the bleed flowpath.

In a further embodiment of any of the foregoing embodiments, additionally and/or alternatively, the ECS does not have any other turbine along the bleed flowpath.

In a further embodiment of any of the foregoing embodiments, additionally and/or alternatively, the turbine is a single stage turbine the ECS does not have a secondary heat exchanger along the bleed flowpath.

In a further embodiment of any of the foregoing embodiments, additionally and/or alternatively, an aircraft includes the aircraft propulsion system of and further comprises: a fuselage; a wing extending from the fuselage; an engine pylon mounting an engine nacelle of the gas turbine engine to the fuselage; and a supplemental propulsion pylon mounting the turbine and propulsion fan to the fuselage.

In a further embodiment of any of the foregoing embodiments, additionally and/or alternatively, the aircraft further comprises a ram air flowpath in heat exchange relation with the bleed flowpath.

In a further embodiment of any of the foregoing embodiments, additionally and/or alternatively: the engine pylon mounts the engine nacelle to the fuselage via the wing; and the supplemental propulsion pylon mounts the turbine and propulsion fan to the fuselage via the wing.

In a further embodiment of any of the foregoing embodiments, additionally and/or alternatively, an aircraft including the aircraft propulsion system of and further comprises a ram air flowpath in heat exchange relation with the bleed flowpath.

In a further embodiment of any of the foregoing embodiments, additionally and/or alternatively, one or more of: the ECS does not have a compressor along the bleed flowpath; the turbine drives only the propulsion fan; the ECS heat exchange relation is at a primary heat exchanger and the ECS does not have a secondary heat exchanger along the bleed flowpath and ram air flowpath; and an electric fan drives air along the ram air flowpath.

In a further embodiment of any of the foregoing embodiments, additionally and/or alternatively, a method for using the aircraft propulsion system in an aircraft comprises: running the gas turbine engine to draw in air, compress the air in a compressor section, mix the air with fuel, combust the mixed air and fuel forming combustion products, expand the combustion products in a turbine section to drive the compressor section, expel the combustion products to produce thrust to propel flight of the aircraft; bleeding a bleed flow of compressed air from the gas turbine engine; passing the bleed flow along the bleed flowpath; and the bleed flow driving the turbine to drive the propulsion fan and help propel the flight of the aircraft.

In a further embodiment of any of the foregoing embodiments, additionally and/or alternatively, the method of further comprises bypassing the turbine to control air temperature delivered to a load of the ECS.

In a further embodiment of any of the foregoing embodiments, additionally and/or alternatively, a controller controls the engine and the bypassing to provide a desired net thrust.

A further aspect of the disclosure involves an aircraft propulsion system comprising: a gas turbine engine; an environmental control system (ECS); and a bleed flowpath from the gas turbine engine through the ECS. The aircraft propulsion system further comprises means for providing supplemental propulsion powered by the ECS.

In a further embodiment of any of the foregoing embodiments, additionally and/or alternatively, the means comprises a bleed-driven turbine.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

A cooling system is proposed that combines an air cycle system (ACS) with a propulsion fan (supplemental propulsion fan supplementing the propulsion provided by the engine). The example air cycle machine (ACM) in the ACS has a single turbine mechanically coupled via a shaft to the propulsion fan. The ACS architecture is like a typical condensing/reheat cycle, except there is not a compressor or secondary heat exchanger in the system so that the turbine powers the propulsion fan instead of the omitted compressor. The secondary heat exchanger may be omitted because of the lack of temperature rise of the omitted compressor. The compressor and secondary heat exchanger elimination may contribute to a smaller and/or lighter ACS than a baseline ACS or other alternative.

The propulsion fan is located and sized to provide supplemental propulsion to the aircraft using the energy extracted from the ACS via the turbine. This architecture may directly provide useful propulsion to the aircraft while creating needed cooling. In various implementations, this may result in a smaller ACS and/or improved SFC relative to a baseline or other alternative.

Figure 1:
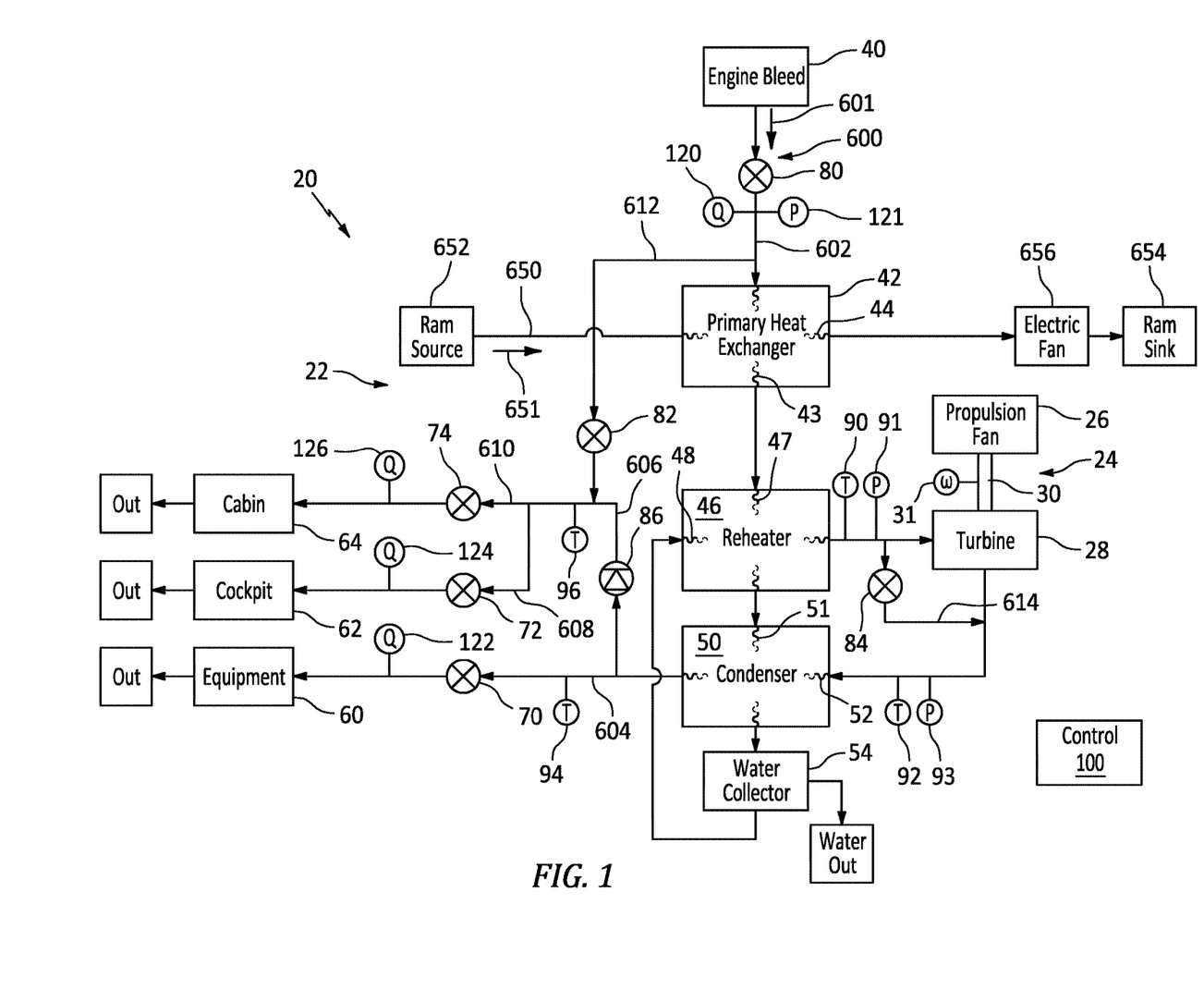
FIG. 1 is a schematic view of a hybrid environmental control system (ECS) and supplemental propulsion system.

FIG. 1 shows an aircraft hybrid environmental control system (ECS) and supplemental propulsion system 20. The basic ECS is an air cycle system (ACS) 22 wherein the airflow powers the supplemental propulsion system 24. The system includes an air flowpath 600 which may be a bleed flowpath passing an air flow 601 (bleed flow) from a compressor bleed on an aircraft engine (discussed further below). The air flowpath 600 may be branching and may be an open flowpath ultimately venting out of the aircraft. Several examples are discussed below. FIG. 1 flow arrows show flow directions of a normal operating mode with the engine bleed providing both power for the supplemental propulsion system 24 and one or more cooling loads 60, 62, 64. The air flowpath may be bounded by ducts linking the various heat exchangers and similar components discussed further below.

The supplemental propulsion system 24 includes the propulsion fan 26 coupled to the turbine 28 to be driven by the turbine (e.g., co-spooled via a shaft 30 supported for rotation about an axis in common via multiple bearings (not shown)). A rotational speed sensor 31 measures speed of the propulsion fan. An example sensor 31 is an optical encoder (e.g., with an encoder wheel mounted to the shaft 30). Alternatives are magnetic encoders.

The example turbine 28 is a centrifugal turbine with radial inlet and axial outlet.

The ACS 22 has, sequentially along the air flowpath 600 (namely a trunk 602 of the air flowpath): an inlet 40 at an engine bleed port; a primary heat exchanger 42, namely a heat rejecting/donor leg 43 thereof; a reheat heat exchanger (reheater) 46, namely a heat rejecting/donor leg 47 thereof; a heat rejection heat exchanger (e.g., condenser) 50 namely, a heat rejecting/donor leg 51 thereof; a water collector 54; the reheater 46 heat receiving/recipient leg 48; the turbine 28 of the propulsion system 24; and the condenser 50 heat receiving/recipient leg 52. The example air flowpath 600 then branches to the loads 60, 62, 64. Thus, this example omits the compressor and secondary heat exchanger from the typical condensing/reheat cycle ACS.

The example load branches include a branch 604 feeding the load 60. The example load 60 is air-cooled equipment (e.g., avionics or other electronics). In one example, the air-cooled equipment is in an equipment bay in the fuselage and the bleed air along the branch 604 is flowed through the equipment bay otherwise unconstrained and vents overboard from the equipment bay. In alternative embodiments, the air flow along the branch 604 may pass constrained through a heatsink to remove/receive heat from the equipment. In the example, a flow control valve 70 is positioned along the branch 604 under control of a control system (controller) 100 which may represent existing control equipment such as a full authority digital engine control (FADEC). Integrating functions of controlling the ACS with the FADEC of the associated engine is advantageous in that it allows the FADEC to control net thrust of the engine and the propulsion fan of the ACS. Alternatively, the controller 100 may represent a conventional computer-based or microcontroller-based ACS controller in communication with the FADEC so as to allow the FADEC to communicate with the ACS controller. The controller may be coupled directly or indirectly to various sensors, input devices, controlled components, and the like via hardwired analog or digital lines including wires or fiber optics.

The example valve 70 is a continuous control throttle valve such as a butterfly valve (e.g., as opposed to a bi-static valve such as a solenoid and/or pulse-width-modulated (PWM) valve). Example actuators for this valve and the other valves include pneumatic actuators and a stepper motors.

The example remaining loads 62 and 64 represent cabin and air services such as cockpit cooling and pressurization 62 and cabin cooling and pressurization 64. They may be fed via respective sub-branches 608 and 610 off of a branch 606 which branches in parallel with the branch 604. The branches 608 and 610 may have valves 72 and 74 (e.g., otherwise similar to the valve 70 discussed above).

In addition to the load branches, the ACS 22 may comprise one or more bypasses. FIG. 1 shows bypass flowpaths (bypasses) 612 and 614. The bypass 612 bypasses relatively warm engine bleed air from a location in the air flowpath trunk 602 upstream of the primary heat exchanger 42 to a location for mixing with one or more of the loads. The example mixing location is along the branch 606. As noted above regarding the prior art, this so-called trim branch/bypass 612 allows mixing of the relatively warm bleed with the relatively cool air exiting the condenser 50 heat receiving/recipient leg 52 along the branch 606. The control of the proportions of the mixing allow control over temperature of air introduced to the loads 62 and 64 and thus allow control over cockpit temperature and cabin temperature. In the illustrated example, the overall bleed flow from the engine is controlled by a valve 80 (e.g., otherwise similar to the valve 70) in the trunk 602 upstream of the trim bypass 612 and flow along the trim bypass 612 is controlled by a valve 82 (e.g., otherwise similar to the valve 70) in the trim bypass.

An additional bypass flowpath (bypass) 614 is a turbine bypass flowpath extending from a location in the air flowpath trunk 602 between the reheater 46 heat receiving/recipient leg 48 and turbine 28 inlet to a location between the turbine outlet and the condenser 50 heat receiving/recipient leg 52 inlet. An example turbine bypass 614 has a valve 84 (e.g., otherwise similar to the valve 70).

The example ACS also includes a check valve 86 in the branch 606 upstream of the junction with the trim bypass 612. The check valve 86 is oriented to prevent a reverse flow. In operation, there will be a pressure drop across the turbine 28 when the turbine is running. Although it may be desirable to moderate cockpit and cabin temperature via blending of warm bleed air, this may not be the case with the air-cooled equipment 60. The check valve 86 thus prevents the trim air from warming the main bleed air delivered to the air-cooled equipment 60. Temperature of the air flow exiting the condenser heat receiving/recipient leg 52 to the branch 604 and the branch 606 upstream of the junction with the trim bypass 612 may be controlled via bypassing the turbine 28 using the turbine bypass valve 84 with increased bypass flow along the turbine bypass 614 increasing temperature and decreased bypass flow decreasing temperature.

Additionally, throughout the system there may be various temperature sensors and pressure sensors. Example temperature sensors are thermocouples or thermistors. Example pressure sensors are piezoelectric diaphragm sensors. FIG. 1 shows a basic example of a temperature sensor 90 and pressure sensor 91 between the reheater and turbine (measuring turbine inlet conditions); a temperature sensor 92 and a pressure sensor 93 between the turbine outlet and condenser heat receiving/recipient leg inlet (measuring conditions of the blended flow from the turbine outlet and turbine bypass); a temperature sensor 94 in the branch 604 (measuring air temperature delivered to the load 60); and a temperature sensor 96 in the branch 606 downstream of the trim bypass (measuring blended air temperatures for the loads 62 and 64).

Thus, an example bleed is at a temperature of about 300° C. and a pressure of about 520 kPa at the bleed inlet 40. The example primary heat exchanger 42 is an air-air heat exchanger, more particularly a brazed plate-fin heat exchanger where the heat receiving/recipient leg is ambient air of a ram flow 651 along a ram air flowpath 650. The example ram air flowpath 650 extends from a ram air inlet 652 to a ram air outlet 654. These may be respective ports on the fuselage or on a wing. The ram air flowpath 650 passes downstream through the heat receiving/recipient leg 44 of the primary heat exchanger and through an optional electric fan 656 (e.g., driven by an electric motor drawing current from an engine-integrated generator or an accessory generator—not shown) before exiting the outlet 654. The bleed air exits the primary heat exchanger heat rejecting/donor leg 43 at an example temperature of about 150° C.

The example reheat heat exchanger (reheater) 46 is a brazed plate-fin heat exchanger. The bleed air exits the reheater heat rejecting/donor leg 47 at an example temperature of about 100° C.

The example heat rejection heat exchanger (e.g., condenser) 50 is a brazed plate-fin heat exchanger. The bleed air exits the condenser heat rejecting/donor leg 51 at an example temperature of about 25° C.

The example water collector 54 is a can-type collector (e.g., as in the '410 patent). The bleed air exits the water collector at an example temperature of about 25° C. The bleed air exits the reheater heat receiving/recipient leg 48 at an example temperature of about 75° C.

Bleed air exits the turbine 28 at an example temperature of about 2° C. and an example pressure of about 170 kPa. The bleed air exits the condenser heat recipient leg 52 at an example temperature of about 80° C.

Figure 2:
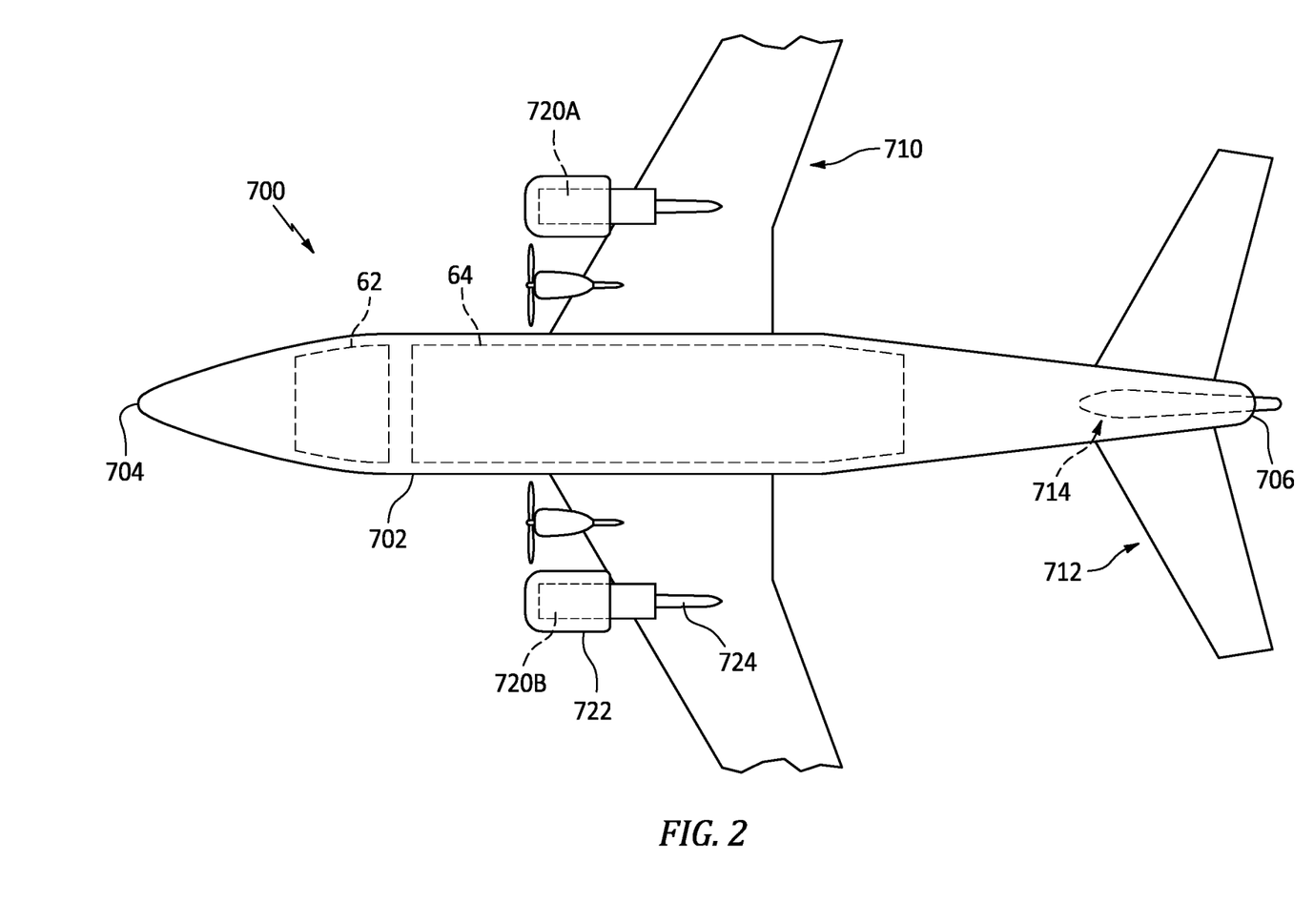
FIG. 2 is a schematic bottom view of an aircraft including the hybrid ECS and supplemental propulsion system of FIG. 1.
Figure 2A:
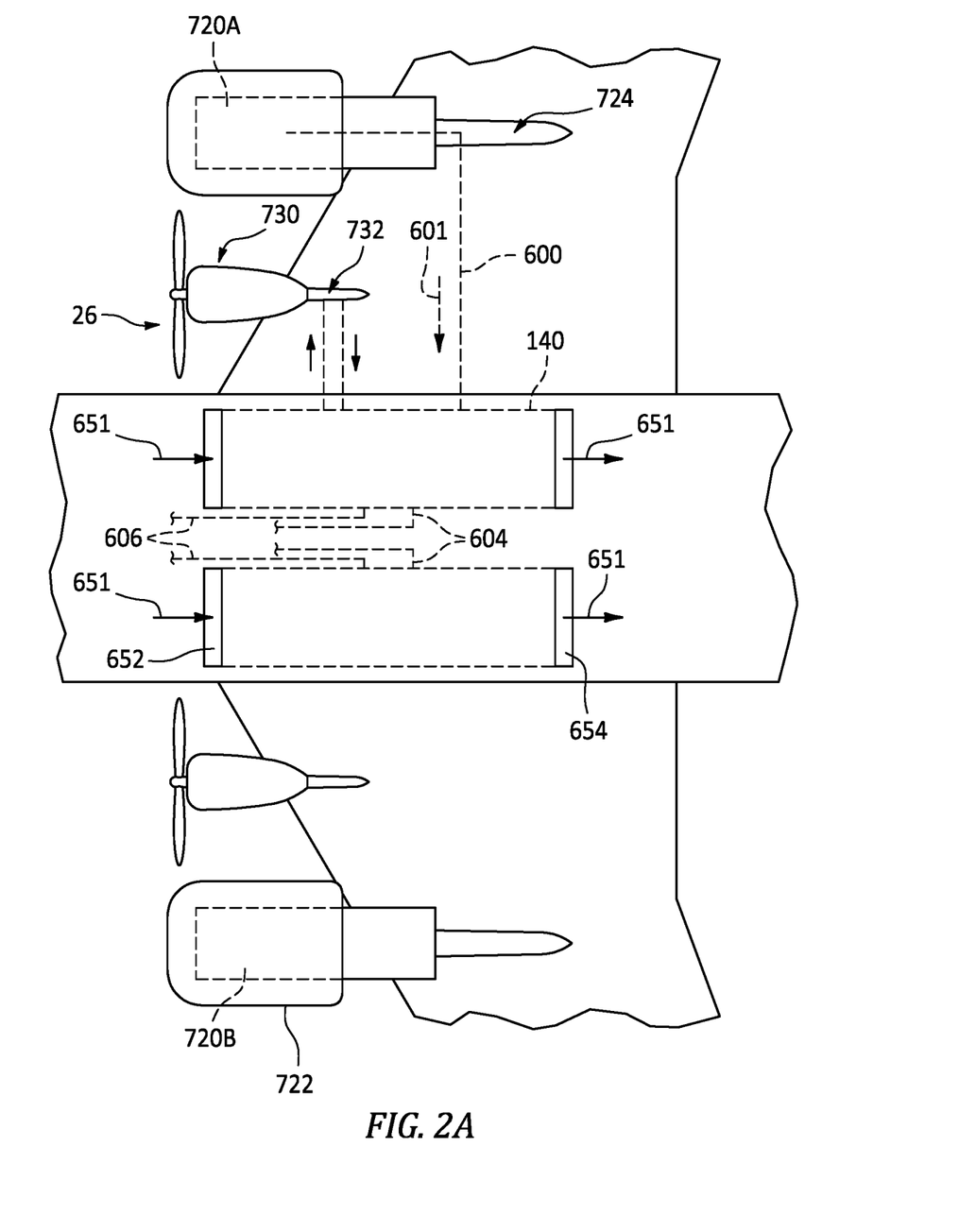
FIG. 2A is an enlarged view of a portion of the aircraft of FIG. 2.
Figure 3:
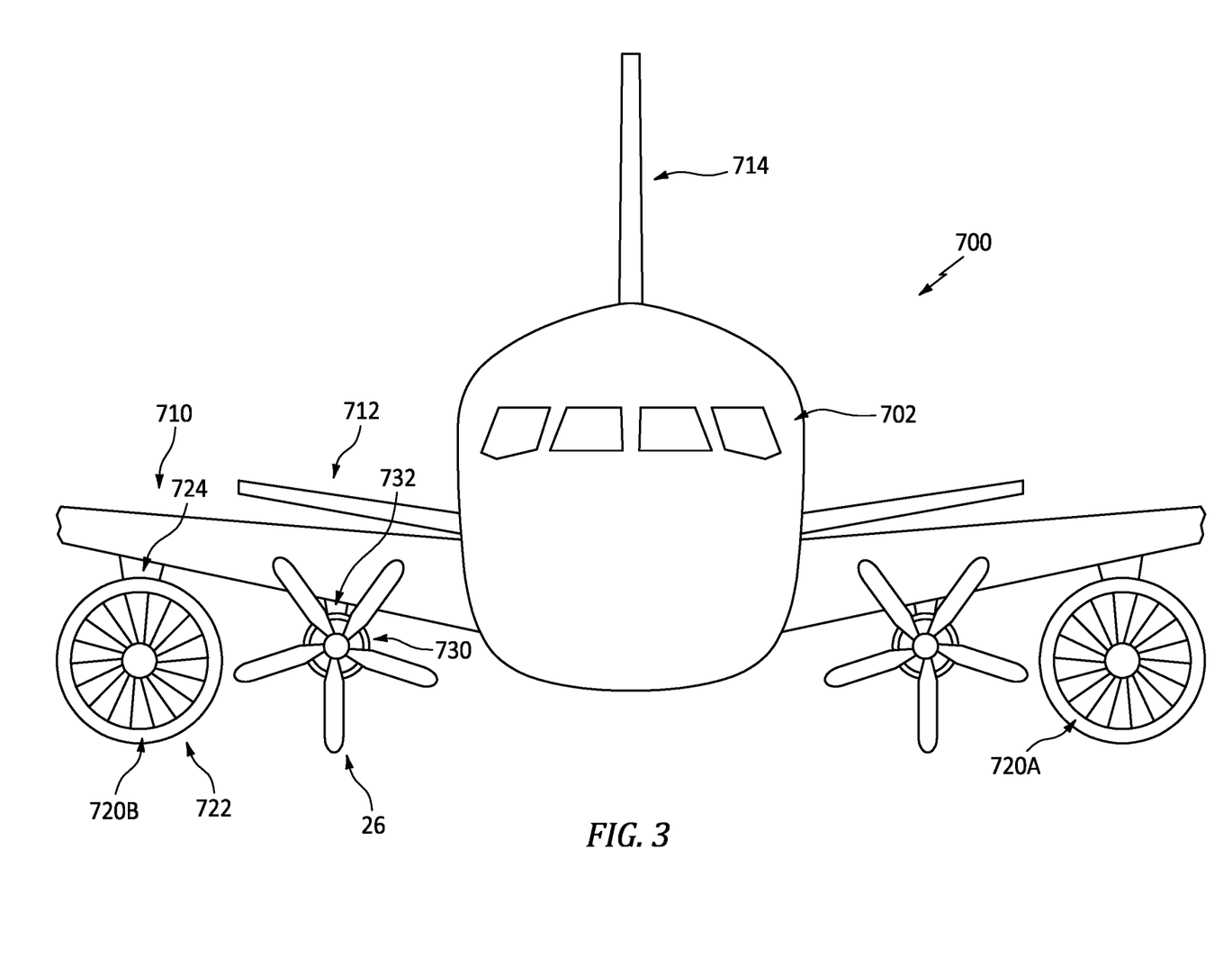
FIG. 3 is a schematic front view of the aircraft.

FIG. 2 schematically shows an aircraft 700 including the hybrid ECS and supplemental propulsion system 20. The example aircraft 700 has a fuselage 702. The fuselage extends from a nose 704 to a tail 706. A main wing 710 extends laterally outward from the fuselage on left and right sides. A horizontal stabilizer 712 and vertical stabilizer 714 are proximate the tail aft of the main wing. Control surface details (not shown) may be conventional. FIG. 2A schematically shows separate ECS associated with the respective engines with each having a ram air inlet 652 and a ram air outlet 654. The main components of each system are contained in a bay 140 in the fuselage (e.g., including the various heat exchangers 42, 46, and 50).

Other aircraft configurations exist including delta wing and delta canard configurations among other configurations lacking the traditional combination of vertical stabilizer and horizontal stabilizer.

The example aircraft has engines 720A, 720B positioned in respective nacelles 722 on respective wing pylons 724. Each engine has its own associated ACM with turbine 28 (and optionally propulsion fan 26) in an adjacent nacelle 730 on an adjacent pylon 732 (e.g., inboard of the associated engine nacelle and pylon). In the illustrated example, the nacelle contains the turbine 28 and the propulsion fan 26 is an unducted fan.

There may be two completely separate ACS or the ACS may share certain components such as combining to feed the cabin, cockpit, or air cooled equipment. The ACS may also be configured to allow the two ACS to both receive bleed air from the same engine in certain abnormal conditions such as a failure of the other engine. In any such implementation, appropriate valves, cross-linking ducts or piping, and the like may be provided to allow the particular operation and isolate any damage that would cause leakage.

Alternative engine nacelles and/or supplemental propulsion nacelles are mounted via their pylons directly to the fuselage rather than via the wing. In alternative variations, the supplemental propulsion system pylon may be omitted and the turbine mounted directly in the wing or fuselage. For example, the turbine may have a sufficiently small diameter to fit within the wing and not require a separate pylon and nacelle (e.g., leaving the propulsion fan 26 external to the wing ahead of the leading edge or aft of the trailing edge).

Figure 4:
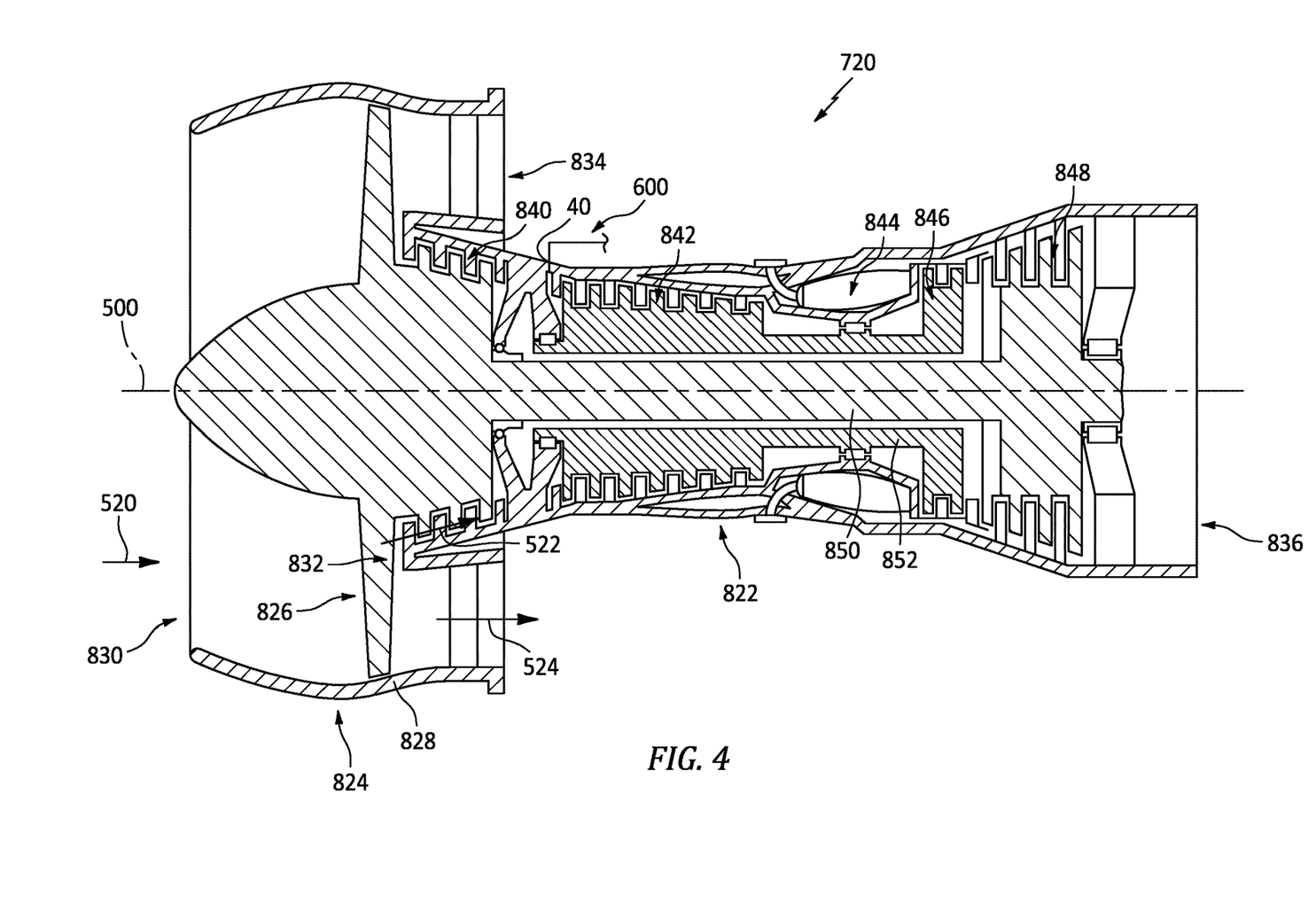
FIG. 4 is a schematic view of a gas turbine engine providing primary propulsion to the aircraft and bleed air for the hybrid ECS and supplemental propulsion system.

FIG. 4 shows an example gas turbine engine 720 (representing the engines 720A and 720B) as a two-spool turbofan engine. The engine 720 has an engine case 822 surrounding a centerline or central longitudinal axis 500. An example engine has a fan section 824 including a fan 826 within a fan case 828. The example engine includes an inlet 830 at an upstream end of the fan case receiving an inlet flow along an inlet flowpath 520. The fan 826 has one or more stages 832 of fan blades. Downstream of the fan blades, the flowpath 520 splits into an inboard portion 522 being a core flowpath and passing through a core of the engine and an outboard portion 524 being a bypass flowpath exiting an outlet 834 of the fan case.

The core flowpath 522 proceeds downstream to an engine outlet 836 through one or more compressor sections, a combustor, and one or more turbine sections. The example engine has two axial compressor sections and two axial turbine sections, although other configurations are equally applicable. From upstream to downstream there is a low pressure compressor section (LPC) 840, a high pressure compressor section (HPC) 842, a combustor section 844, a high pressure turbine section (HPT) 846, and a low pressure turbine section (LPT) 848. Each of the LPC, HPC, HPT, and LPT comprises one or more stages of blades which may be interspersed with one or more stages of stator vanes.

In the example engine, the blade stages of the LPC and LPT are part of a low pressure spool mounted for rotation about the axis 500. The example low pressure spool includes a shaft (low pressure shaft) 850 which couples the blade stages of the LPT to those of the LPC and allows the LPT to drive rotation of the LPC. In the example engine, the shaft 850 also drives the fan. In the example implementation, the fan is driven via a transmission (not shown, e.g., a fan gear drive system such as an epicyclic transmission) to allow the fan to rotate at a lower speed than the low pressure shaft.

The example engine further includes a high pressure shaft 852 mounted for rotation about the axis 500 and coupling the blade stages of the HPT to those of the HPC to allow the HPT to drive rotation of the HPC. In the combustor 844, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan. The example bleed port forming the inlet 40 is an inter-section bleed between LPC and HPC. Alternatives are inter-stage bleeds within the LPC.

In use, the bleed valve 80 just upstream of the primary heat exchanger 42 controls overall pressure into the system and in general, the cooling capacity of the package. The trim valve 82 from the engine bleed to the cabin and cockpit tapoffs provides warm air when needed for temperature control. The turbine bypass valve 84 provides the ability to control the mixed out temperature downstream of the turbine.

Component materials and manufacture techniques and assembly techniques may be otherwise conventional for ACS. Additionally, conventional metal or composite manufacture techniques may be used for the supplemental fans.

In a control example, the controller 100 provides feedback control over inlet pressure to the ACS via control of the valve 80. The controller 100 receives a signal from the pressure sensor 121 that relates to the pressure just downstream of valve 80. The controller 100 is pre-programmed with a look-up table or equation that provides a reference value (the target pressure or proxy) based on parameters such as one or more of altitude, external temperature, external pressure, airspeed, and the like. Typically this will at least include altitude. The controller 100 compares the signal from the pressure sensor 121 to the reference value. The controller 100 sends a signal to the actuator for valve 80 to increase valve position (open the valve more) if the signal from pressure sensor 121 is less than the reference value. Controller 100 sends a signal to the actuator for valve 80 to decrease valve position (close the valve more) if the signal from pressure sensor 121 is greater than the reference value.

In an alternative control example, the controller 100 controls the mass flow rate into the system instead of the pressure into the system. The controller 100 receives a signal from mass flow rate sensor 120 that relates to the mass flow rate just downstream of the valve 80. Example flow sensors are Venturi-type sensors or hot wire anemometers. The controller 100 is pre-programmed with a look-up table or equation that provides a reference value (the mass flow rate or proxy) based on parameters such as one or more of altitude, external temperature, external pressure, airspeed, and the like. Typically this will at least include altitude. The controller 100 compares the signal from the mass flow rate sensor 120 to the reference value. The controller 100 sends a signal to the actuator for the valve 80 to increase valve position (open the valve more) if the signal from the mass flow rate sensor 120 is less than the reference value. The controller 100 sends a signal to the actuator for valve 80 to decrease valve position (close the valve more) if the signal from mass flow rate 120 is greater than the reference value.

The controller 100 controls the air temperature into the cold inlet of condenser 50. The controller 100 receives a signal from temperature sensor 92 that relates to the air temperature at the cold inlet of condenser 50. The controller 100 is pre-programmed with a look-up table or equation that provides a reference value (the temperature or proxy) based on parameters such as one or more of altitude, external temperature, external pressure, airspeed, and the like. Typically this will at least include altitude. The reference value may correspond to a target temperature selected to be cold enough to provide a required cooling capacity while not risking icing/freezing. The controller 100 compares the signal from the temperature sensor 92 to the reference value. The controller 100 sends a signal to the actuator for the valve 84 to increase valve position (open the valve more) if the signal from the temperature sensor 92 is less than the reference signal. The controller 100 sends a signal to the actuator for the valve 84 to decrease valve position (close the valve more) if the signal from temperature sensor 92 is greater than the reference value. Optionally, a transient defrost mode may be actuated with a higher target either intermittently or responsive to sensed icing/freezing.

The controller 100 controls the air temperature to cockpit 62 and cabin 64. The controller 100 receives a signal from the temperature sensor 96 that relates to the temperature of the air flowing to cockpit 62 and cabin 64. The controller 100 is pre-programmed with a look-up table or equation that provides a reference value (the temperature or proxy) based on parameters such as one or more of altitude, external temperature, external pressure, airspeed, and the like. Typically this will at least include altitude.. The pilot may make use of a manual override function to set a higher reference value for additional heating when desired. The controller 100 sends a signal to the actuator for the valve 82 to increase valve position (open the valve more) if the signal from the temperature sensor 96 is less than the reference value. The controller 100 sends a signal to the actuator for valve 82 to decrease valve position (close the valve more) if the signal from the temperature sensor 96 is greater than the reference signal.

The controller 100 controls the mass flow rate to provide cooling to equipment 60. The controller 100 receives signals from the temperature sensor 94 and mass flow rate sensor 122 that relate to the temperature and mass flow rate, respectively, to equipment 60. The controller 100 is pre-programmed with a look-up table or equation that provides a reference value (the mass flow rate or proxy) based on parameters such as altitude, external temperature, external pressure, airspeed, and the like. Typically this will at least include altitude, as well as the signal from the temperature sensor 94. The controller 100 sends a signal to the actuator for valve 70 to increase valve position (open the valve more) if the signal from mass flow rate sensor 122 is less than the reference signal. The controller 100 sends a signal to the actuator for the valve 70 to decrease valve position (close the valve more) if the value from the mass flow rate sensor 122 is greater than the reference value.

The controller 100 controls the mass flow rate to provide conditioned air to cockpit 62. The controller 100 receives signals from the temperature sensor 96 and the mass flow rate sensor 124 that relate to the temperature and mass flow rate, respectively, to cockpit 62. The controller 100 is pre-programmed with a look-up table or equation that provides a reference value (the mass flow rate or proxy) based on parameters such as one or more of altitude, external temperature, external pressure, airspeed, and the like (typically this will at least include altitude), as well as the signal from the temperature sensor 96. The controller 100 sends a signal to the actuator for the valve 72 to increase valve position (open the valve more) if the signal from mass flow rate sensor 124 is less than the reference value. The controller 100 sends a signal to the actuator for the valve 72 to decrease valve position (close the valve more) if the signal from the mass flow rate sensor 124 is greater than the reference value. Additional parameters may reflect air quality/refresh standards for crew health. Such standards restrict flow rate options. Thus, cockpit and cabin cooling may be more controlled by the temperature of the delivered air than flow rate.

The controller 100 controls the mass flow rate to provide conditioned air to the cabin 64. The controller 100 receives signals from the temperature sensor 96 and mass flow rate sensor 126 that relate to the temperature and mass flow rate, respectively, to the cabin 64. The controller 100 is pre-programmed with a look-up table or equation that provides a reference value (the mass flow rate or proxy) based on parameters such as one or more of altitude, external temperature, external pressure, airspeed, and the like (typically this will at least include altitude), as well as the signal from the temperature sensor 96. The controller 100 sends a signal to the actuator for the valve 74 to increase valve position (open the valve more) if the signal from the mass flow rate sensor 126 is less than the reference value. The controller 100 sends a signal to the actuator for the valve 74 to decrease valve position (close the valve more) if the signal from the mass flow rate sensor 124 is greater than the reference value. Additional parameters may reflect air quality/refresh standards for passenger health. Such standards restrict flow rate options. Thus, cockpit and cabin cooling may be more controlled by the temperature of the delivered air than flow rate.

The controller 100 controls the operation of the associated main propulsion engine720A, 720B. The controller 100 receives signals from temperature sensor 90, pressure sensor 91, temperature sensor 92, pressure sensor 93, mass flow rate signal 120, and rotational speed sensor 31. The controller 100 uses these inputs along with pre-programmed look-up tables and/or functions of turbine performance to estimate the work extracted via turbine 28. The controller 100 further uses parameters such as altitude, external temperature, external pressure, airspeed, and the like to estimate the propulsive thrust from propulsion fan 26. The controller 100 then makes necessary adjustments to control effectors on the main propulsion engine to achieve the overall propulsive thrust that is desired from that pairing of engine and propulsion fan.

More complex control algorithms may interrelate the various controlled parameters discussed above (or others).

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration of aircraft, engine, or ECS, details of such baseline may influence details of particular implementations. Accordingly, other embodiments are within the scope of the following claims.

What is claimed is:

1. An aircraft propulsion system comprising:
a gas turbine engine;
an environmental control system (ECS); and
a bleed flowpath from the gas turbine engine through the ECS, and further comprising:
a turbine of the ECS along the bleed flowpath; and
a propulsion fan mechanically coupled to the turbine to be driven by the turbine to provide a propulsive thrust component parallel to a thrust component of the gas turbine engine.

2. The aircraft propulsion system of claim 1 wherein:
the turbine drives only the propulsion fan.

3. The aircraft propulsion system of claim 1 wherein the ECS has, sequentially along the bleed flowpath:
a primary heat exchanger;
a first leg of a reheater heat exchanger;
a first leg of a condenser heat exchanger;
a water collector;
a second leg of the reheater heat exchanger in heat exchange relation with the first leg of the reheater heat exchanger;
the turbine;
a second leg of the condenser heat exchanger in heat exchange relation with the first leg of the condenser heat exchanger; and
a load.

4. The aircraft propulsion system of claim 3 further comprising:
a valve-controlled bypass flowpath bypassing the turbine from downstream of the reheater heat exchanger second leg to upstream of the condenser heat exchanger second leg.

5. The aircraft propulsion system of claim 3 wherein:
the primary heat exchanger provides heat exchange between the bleed flowpath and a ram air flowpath.

6. The aircraft propulsion system of claim 3 wherein:
the load is a passenger cabin air source.

7. The aircraft propulsion system of claim 3 wherein:
the reheater heat exchanger is a plate-fin heat exchanger;
the condenser heat exchanger is a plate-fin heat exchanger; and
the water collector is a can-type collector.

8. The aircraft propulsion system of claim 1 wherein:
the ECS does not have a compressor along the bleed flowpath.

9. The aircraft propulsion system of claim 1 wherein:
the ECS does not have a secondary heat exchanger along the bleed flowpath.

10. The aircraft propulsion system of claim 1 wherein:
the turbine is a single stage turbine and the ECS does not have any other turbine along the bleed flowpath.

11. An aircraft including the aircraft propulsion system of claim 1 and further comprising:
a fuselage;
a wing extending from the fuselage;
an engine pylon mounting an engine nacelle of the gas turbine engine to the fuselage; and
a supplemental propulsion pylon mounting the turbine and propulsion fan to the fuselage.

12. The aircraft of claim 11 further comprising:
a ram air flowpath in heat exchange relation with the bleed flowpath.

13. The aircraft of claim 12 wherein:
the engine pylon mounts the engine nacelle to the fuselage via the wing; and
the supplemental propulsion pylon mounts the turbine and propulsion fan to the fuselage via the wing.

14. An aircraft including the aircraft propulsion system of claim 1 and further comprising:
a ram air flowpath in heat exchange relation with the bleed flowpath.

15. The aircraft of claim 14 wherein one or more of:
the ECS does not have a compressor along the bleed flowpath;
the turbine drives only the propulsion fan;
the ECS heat exchange relation is at a primary heat exchanger and the ECS does not have a secondary heat exchanger along the bleed flowpath and ram air flowpath; and
an electric fan drives air along the ram air flowpath.

16. A method for using the aircraft propulsion system of claim 1 in an aircraft, the method comprising:
running the gas turbine engine to draw in air, compress the air in a compressor section, mix the air with fuel, combust the mixed air and fuel forming combustion products, expand the combustion products in a turbine section to drive the compressor section, expel the combustion products to produce the thrust component to propel flight of the aircraft;
bleeding a bleed flow of compressed air from the gas turbine engine;
passing the bleed flow along the bleed flowpath; and
the bleed flow driving the turbine to drive the propulsion fan to provide said propulsive thrust component and help propel the flight of the aircraft.

17. The method of claim 16 further comprising:
bypassing the turbine to control air temperature delivered to a load of the ECS.

18. The method of claim 17 wherein:
a controller controls the engine and the bypassing to provide a desired net thrust of the propulsion fan and the gas turbine engine.

19. An aircraft propulsion system comprising:
a gas turbine engine;
an environmental control system (ECS); and
a bleed flowpath from the gas turbine engine through the ECS, and further comprising:
means for providing a supplemental thrust component parallel to a thrust component of the pas turbine engine, the means for providing the supplemental thrust component powered by the ECS.

20. The aircraft propulsion system of claim 19 wherein:
the means comprises a bleed-driven turbine.

* * * * *